(12) United States Patent
Lu et al.

(10) Patent No.: US 8,937,911 B2
(45) Date of Patent: Jan. 20, 2015

(54) METHOD AND SYSTEM FOR SHARING RESOURCES IN A WIRELESS COMMUNICATION NETWORK

(75) Inventors: Jianmin Lu, San Diego, CA (US); Tao Wu, Carlsbad, CA (US); Yunsong Yang, San Diego, CA (US); Quanzhong Gao, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1003 days.

(21) Appl. No.: 11/776,326

(22) Filed: Jul. 11, 2007

(65) Prior Publication Data
US 2008/0095071 A1 Apr. 24, 2008

Related U.S. Application Data

(60) Provisional application No. 60/824,284, filed on Aug. 31, 2006.

(51) Int. Cl.
*H04W 4/00* (2009.01)
*H04W 72/04* (2009.01)

(52) U.S. Cl.
CPC .......... *H04W 72/048* (2013.01); *H04W 72/042* (2013.01)
USPC .......................................... 370/329; 455/450

(58) Field of Classification Search
CPC . H04W 72/005; H04W 72/04; H04W 72/121; H04W 72/1289; H04L 1/1887
See application file for complete search history.

(56) References Cited

U.S. PATENT DOCUMENTS

| 4,837,858 A * | 6/1989 | Ablay et al. ............. 455/509 |
| 6,771,987 B1 | 8/2004 | Dam et al. |
| 2001/0033560 A1 * | 10/2001 | Tong et al. ............. 370/337 |

(Continued)

FOREIGN PATENT DOCUMENTS

| CN | 1385008 A | 12/2002 |
| CN | 1400805 A | 3/2003 |

(Continued)

OTHER PUBLICATIONS

Bi, H., et al., "Resource Management in VoIP Support," 3rd Generation Partnership Project 2, Apr. 2006, pp. 1-6, Motorola, Inc.

(Continued)

*Primary Examiner* — Steven H Nguyen
(74) *Attorney, Agent, or Firm* — Slater & Matsil, LLP

(57) ABSTRACT

Methods and systems for resource allocation in a wireless communication network are disclosed. According to an embodiment, a first portion of a communication resource is allocated by an access node to a first set of access terminals for performing voice communication and a second portion of the communication resource to a second set of access terminals for performing data communication without the statistical characteristics of voice traffic, wherein the allocation is represented by a group message indicated by a first bitmap and a second bitmap, for a group comprising the first set of access terminals and the second set of access terminals, respectively. A terminal in the second set of access terminals can be in an additional group comprising a third set of access terminals configured to perform voice communication through the access node, and a fourth set of access terminals configured to perform data communication without the statistical characteristics of voice traffic.

23 Claims, 4 Drawing Sheets

(56) References Cited

U.S. PATENT DOCUMENTS

| | | | |
|---|---|---|---|
| 2001/0053141 A1* | 12/2001 | Periyalwar et al. | 370/337 |
| 2002/0064167 A1 | 5/2002 | Khan et al. | |
| 2002/0151321 A1 | 10/2002 | Winchell et al. | |
| 2003/0027588 A1 | 2/2003 | Futakata et al. | |
| 2003/0067935 A1 | 4/2003 | Hosein | |
| 2003/0202500 A1 | 10/2003 | Ha et al. | |
| 2007/0116024 A1 | 5/2007 | Zhang et al. | |
| 2007/0121543 A1* | 5/2007 | Kuchibhotla et al. | 370/329 |
| 2007/0121946 A1 | 5/2007 | Ito et al. | |
| 2007/0230412 A1* | 10/2007 | McBeath et al. | 370/329 |
| 2007/0274288 A1 | 11/2007 | Smith et al. | |
| 2008/0025247 A1* | 1/2008 | McBeath et al. | 370/321 |
| 2008/0025337 A1* | 1/2008 | Smith et al. | 370/439 |
| 2008/0037496 A1* | 2/2008 | Smith et al. | 370/340 |
| 2008/0049692 A1* | 2/2008 | Bachu et al. | 370/338 |
| 2008/0062178 A1 | 3/2008 | Khandekar et al. | |
| 2008/0089354 A1* | 4/2008 | Yoon et al. | 370/432 |
| 2008/0095071 A1 | 4/2008 | Lu et al. | |
| 2008/0310528 A1 | 12/2008 | Soong et al. | |
| 2009/0022098 A1 | 1/2009 | Novak et al. | |

FOREIGN PATENT DOCUMENTS

| | | |
|---|---|---|
| CN | 1416231 A | 5/2003 |
| CN | 1537372 A | 10/2004 |
| CN | 1600005 A | 3/2005 |
| WO | WO 2005/006639 A1 | 1/2005 |
| WO | WO 2005/048614 A | 5/2005 |
| WO | WO 2007/124675 A1 | 11/2007 |

OTHER PUBLICATIONS

McBeath, S., et al., "Call Grouping using Bitmap," 3rd Generation Partnership Project 2, Jul. 2006, pp. 1-3, Motorola, Inc.

Soong, A., et al., "Resource Sharing in VoIP Group for LBC," 3rd Generation Partnership Project 2, Sep. 2006, pp. 1-8, Huawei Technologies Co., Ltd.

Bi, H., et al., "Sharing Persistant Assignments in the Group Resource Allocation," 3rd Generation Partnership Project 2, Sep. 2006, pp. 1-4 Motorola, Inc.

Bi, H., et al., "Group Resource Allocation Enhancements," 3rd Generation Partnership Project 2, Sep. 2006, pp. 1-9, Motorola, Inc.

"Group Resource Allocation Components Proposal," 3rd Generation Partnership Project 2, Dec. 2006, pp. 1-21, Huawei Technologies Co., Ltd., et al.

Novak, R., et al., "Group Resource Allocation Bitmap Signalling Enhancement," 3GPP2 TSG-C, C030-20060911-045, Sep. 11, 2006, pp. 1-9, 3rd Generation Partnership Project 2.

Reed, D., et al., "Reverse Link with VoIP with Group Scheduling," 3GPP2 TSG-C WG3, C30-20060911-103, Sep. 11, 2006, pp. 1-5, 3rd Generation Partnership Project 2.

Zhouyue, P., et al., "VoIP Group Enhancements," 3GPP2, C30-20060911-114, Sep. 11, 2006, pp. 1-4, 3rd Generation Partnership Project 2.

\* cited by examiner

| Index1 | Index2 | ... | Index_K |

Mode 2: Data Bitmap Header with User Index

FIG. 3C

| 1 | 2 | 3 | 4 | ... | M-3 | M-2 | M-1 | M |
|---|---|---|---|-----|-----|-----|-----|---|
| 0 | 1 | 0 | 0 | ... | 0 | 1 | 1 | 0 |

Mode 3: Data Bitmap Header with Bitmap Indication

FIG. 3D

METHOD AND SYSTEM FOR SHARING RESOURCES IN A WIRELESS COMMUNICATION NETWORK

CROSS-REFERENCES TO RELATED APPLICATIONS

This application claims priority to U.S. Provisional Application No. 60/824,284, filed Aug. 31, 2006, which is incorporated by reference herein for all purposes.

BACKGROUND OF THE INVENTION

The present invention generally relates to telecommunication techniques. More particularly, the present invention relates to a method for providing a scheme in which groups of users are able to share communication resources (e.g., time-frequency resource) in a wireless communication network. More specifically, embodiments of the present invention allows wireless communication network users who are assigned to one or more groups to access and use the wireless communication network for various types of communications in an efficient manner by sharing communication channels. For example, valuable resources that are not utilized for voice communication are used for transferring data. But it would be recognized that the invention has a much broader range of applicability.

While packet data traffic and applications thereof have been rapid developed and widely utilized, quality voice transmission remains a fundamental aspect of designing a wireless communication system. Efficient management of coexisting voice and data users is often essential to the network performance, especially in a wireless communication network. For example, in a CDMA2000 1x EVolution Data Optimized (1xEV-DO) system, transmissions of packet data and voice over IP (VoIP) traffics between Access Network (AN) and Access Terminal (AT) are typically scheduled by the AN.

Voice traffic, while being a part of a real time application, is usually discontinuous in nature and composes of large inactive periods. It is often desired to group a certain number of voice users together and assign them a set of shared time-frequency resource. The statistical multiplexing gain is achieved among the group members. For example, when the base station has determined a discontinuous transmission (DTX) state for a user in a particular time period, it can assign the user's transmission (e.g., time and/or frequency) resources to another user. The statistical multiplexing gain is also achieved through the early terminated hybrid automatic request (HARQ) transmissions. For example, once a user acknowledges its VoIP packet, the time-frequency resources become available to other group members based on the implemented scheduling algorithm.

Over the past, various conventional techniques have been proposed to allow unused transmission resource to be allocated to other users for voice communication. For example, such technique has been proposed in the Third Generation Partnership Project 2 (3GPP2).

According to a conventional technique, a unique identifier (e.g., GroupID) is assigned to a group when the group is established. When access node (AN) assigns an access terminal (AT) to the group, the AN associates the AT's unique identifier (e.g., MACIndex) to the GroupID through a Group Setup Message, as shown in Table 1. The message is managed through upper layer signaling carried on Forward Link Data Channel (F-DCH).

TABLE 1

Group Setup Message for Voice Users

| Field | Description |
|---|---|
| MAC_Index | Unique identifier of the AT |
| Group_ID | Unique identifier for the group |
| Block_Size | The fundamental block size (e.g. 1 DRCH by 1 Frame) |
| Num_Blocks | Number of blocks assigned to this group |
| First_Block | Address of the first block in the assignment |
| Ordering_Pattern | One of a few choices indicating the order in which the blocks are to be distributed |
| F_Mod_Coding | Coding and modulation for full rate frames |
| H_Mod_Coding | Coding and modulation for half rate frames |
| Q_Mod_Coding | Coding and modulation for quarter rate frames |
| E_Mod_Coding | Coding and modulation for eighth rate frames |
| Interlace_Structure | The pattern and structure of the VoIP interlace |
| Bitmap1_Length | Length of the first bitmap |
| Bitmap2_Length | Length of the second bitmap (if used) |
| Bitmap_Channel | Time frequency resources for the bitmap itself |
| AT_Index | The bitmap position assigned to the AT |
| Interlace_Offset | Offset assigned to the AT indicative of its first transmission |

The Group Setup Message defines the exact locations of the resource blocks and an ordering pattern indicative of the order in which the resources are allocated. In the time domain, the set of shared resources is a group of VoIP frames comprising a VoIP interlace pattern. In the frequency domain, the shared resource is typically a set of DRCHs (Distributed Resource Channel), although a set of BRCHs (Block Resource Channel) could be used also.

Each AT is assigned a unique ordering index within the group, and a fixed interlace offset within a superframe for its first subpacket transmission. This is to align the time between successive first transmissions to the vocoder frame duration (e.g., approximately 20 msec).

Once a group of users is established and assigned a set of shared time-frequency resources, Group Resource Allocation message that uses bitmap signaling is utilized to assign resource to individual users in each VoIP frame. FIG. 1 is a simplified diagram illustrating a conventional resource allocation technique. The bitmap signaling is used by the base station to assign resources and by the users to determine their exact resources within the set of shared time-frequency resources. It is used for first subpacket and subsequent retransmissions.

A first bitmap (e.g., referred to as bitmap1) has a length of number of users in the group. This first bitmap is used to indicate which ATs are being served in each VoIP frame, where each AT corresponds to a fixed location in the bitmap based on its ordering index. For example, the "1" indicates an active user and a "0" indicates a non-active user in the corresponding VoIP frame. A second bitmap (e.g., referred to as bitmap2) may be used to indicate the amount of resources (e.g., number of assigned blocks and/or the packet format) allocated to the corresponding user.

Each AT determines its allocation based on the allocations for all ATs with a smaller bitmap position in the first bitmap. The first bitmap is used to indicate active ATs. The bitmap locations correspond to the AT positions. For example, the AT assigned the $0^{th}$ group position determines its assignment based on the $0^{th}$ position in the first bitmap. Each AT with a "1" in the first bitmap is active. For example, the AT with the first '1' is assigned the first M blocks, and the AT with the second "1" is assigned the second N blocks, and so on. The M and N are the same if only the first bitmap is available, and M and N may be different if there are two bitmaps. The user with the first "1" in the first bitmap corresponds to the first position in the second bitmap, the user with the second "1" in the first bitmap corresponds to the second position in the second bitmap, etc. According to certain embodiments, the users with "0" in the first bitmap also have a position in the second bitmap.

The ATs are assigned an ACK position based on their position assignment in the first bitmap. For example, the first N/2 ATs in the first bitmap will be assigned to transmit their ACK in the first ACK position, while the second N/2 ATs in the first bitmap will be assigned to transmit their ACK in the second ACK position. Similarly, an even/odd structure could be used, whereby ATs with an odd position assignment in the first bitmap will be assigned to transmit their ACK in the first ACK position, while ATs with an even position assignment in the first bitmap will be assigned to transmit their ACK in the second ACK position.

To minimize the impact of a detection error of a new H-ARQ sequence indicator, the beginning of a new H-ARQ sequence is indicated by an ARQ Instance Sequence Number (AI_SN) that toggles between two indicators when the transmission for a new H-ARQ sequence starts and the signal remains the same when the transmission is for the subsequent sub-packet of a previously failed sub-packet. Specifically, a transmitter transmits the same indicator with each sub-packet of the same H-ARQ sequence. With the beginning of a new H-ARQ sequence, the transmitter switches the indicator to the other indicator. If a receiver misses the new H-ARQ indicator with the first sub-packet transmission, the receiver can still detect the new H-ARQ indicator because the indicator in the subsequent sub-packet transmission is different from the indicator used in the previous packet transmission. Therefore, the new H-ARQ indicator is sufficiently robust to detection error.

The method as described above is useful for many applications. Unfortunately, this method, along with other conventional techniques, may not be adequate for various reasons. Therefore, an improved system and method is desired.

BRIEF SUMMARY OF THE INVENTION

The present invention generally relates to telecommunication techniques. More particularly, the present invention relates to a method for providing a scheme in which groups of users are able to share communication resources (e.g., time-frequency resource) in a wireless communication network. More specifically, embodiments of the present invention allows wireless communication network users who are assigned to one or more groups to access and use the wireless communication network for various types of communications in an efficient manner by sharing communication channels. For example, valuable resources that are not utilized for voice communication is used for transferring data. But it would be recognized that the invention has a much broader range of applicability.

It is another objective of the present invention to better serve the voice users by assigning a larger resource block to both voice and data users (than that of voice users only) but in the meantime, maintaining higher priority for voice user transmissions.

In accordance with one aspect of the present invention, a novel method for grouping the voice and data users and having them efficiently share the time-frequency resource is disclosed, the method comprising: sending Group Setup Message (different from the one to voice users) by the AN to each data user assigned to the group with the user and group specified information; using bitmap signaling (with variants using AI_SN and user index) to inform voice and data users whether they are activated or not, which resource blocks they are assigned, and/or which modulation and coding scheme indices are assigned; monitoring the bitmaps by the said data users upon receiving this Group Setup Message; controlling the admission of data users over data users based on their QoS requirements; assigning a data user in multiple groups to alleviate the resource constraint for possible retransmissions; broadcasting information (e.g., group management information) to all users within the group using left over resources or other resources signaled by bitmap, F_SCCH, or GroupID based blind detection.

According to a first preferred embodiment of the present invention, the transmissions to multiple (N) voice users are multiplexed with the transmissions to multiple (M) data users to share the same time-frequency resource by using an extended bitmap signaling. While the voice users have higher priority to be served, the remaining resource, if any, may be divided to K data pipes which allows up to K data users transmitting at the same time. Following the VoIP bitmap, data bitmap is added to indicate the packet data transmission. A scheduler at the AN decides which data user is being served and which modulation and coding scheme (MCS) is being used based on the channel quality, the QoS requirement and the buffer status, etc. A data bitmap typically includes a data bitmap header and the corresponding MCS and resource size fields. Each active data user will look at the bitmap for the users in front of it (including both voice and data), calculate the occupied blocks, and locate the exact blocks being assigned to the said data user. The encoded packet size depends on the size of left-over resource and the MCS scheme used. Padding may also be needed if the number of information bits is less than the encoded packet size. The scheduler is designed to balance the power and MCS of the data user. The mapping from the MCS bits to actual packet format can be adjusted by upper layer signaling.

According to a variant of the first preferred embodiment of the present invention, multiple (N) voice users are grouped with multiple (M) data users to share the same time-frequency resource by using an AI_SN bit for each data pipe in Data Bitmap Header. A new packet indicator, AI_SN as described in above, is used to indicate the start of a new packet for the data pipe, by means of setting as or '0' or by toggling. Once a new H-ARQ packet is indicated, all data users in the group will try to blindly detect the packet, but only the scheduled user in this data pipe will be succeed as the packet has been scrambled with this user's MACID.

According to another variant of the first preferred embodiment of the present invention, multiple (N) voice users are grouped with multiple (M) data users to share the same time-frequency resource by explicitly indicate user index for each data pipe in Data Bitmap Header. One of the MCS values, e.g. "000", is reserved to indicate the retransmission of a packet while all other values indicate new packet transmission.

According to further variant of the first preferred embodiment of the present invention, multiple (N) voice users are grouped with multiple (M) data users to share the same time-frequency resource by using bitmap mapping in the Data Bitmap Header. The Data Bitmap Header has a length of M, and each bit indicates the corresponding data user is active or not. Similarly, one of the MCS values, e.g. "000", needs to be reserved to indicate the retransmission of a packet while all other values indicate new packet transmission.

According to an embodiment, the present invention provides a method for resource allocation in a wireless communication network. The method includes providing an access node. The access node is configured to provide wireless access for both voice and data services. The method also includes providing at least a first access terminal that is configured to perform at least voice communication through the access node. Additionally, the method includes providing at least a second access terminal that is configured to perform at least data communication through the access node. The method further includes allocating a first portion of communication resources to the first access terminal. The method additionally includes allocating a second portion of communication of resources to the second access terminal. Furthermore, the method includes generating and sending a group resource allocation message, which includes at least a first bitmap and a second bitmap, to at least the first access terminal and the second access terminal. The first bitmap indicates at least the first portion. The second bitmap indicates at least the second portion. The method also includes generating and sending the group setup message to at least the first access terminal and the second access terminal to define the specific parameters associated with the group.

According to another embodiment, the present invention provides a method for communication in a wireless communication network. The method includes providing an access node that is configured to provide wireless access for both voice and data services. The method also includes providing at least a first access terminal that is configured to perform at least data communication through the access node. The method further includes receiving a group resource allocation message by the first access terminal. The group resource allocation message includes at least a first bitmap and a second bitmap. The first bitmap indicates a first resource allocation associated with a voice communication. The second bitmap indicates a second resource allocation associated with a data communication. The method additionally includes transferring data by the second access terminal based the first resource allocation indicated by the first bitmap.

According to yet another embodiment, the present invention provides a system for resource allocation in a wireless communication network. The system includes an access node that is configured to provide wireless access for both voice and data services. The system also includes at least a first access terminal that is configured to perform at least voice communication through the access node. The system further includes at least a second access terminal that is configured to perform at least data communication through the access node. The access node is further configured to allocate a first portion of communication resources to the first access terminal. The access node is further configured to allocate a second portion of communication of resources to the second access terminal. The access node is further configured to generate a group resource allocation message, the group resource allocation message including at least a first bitmap and a second bitmap, the first bitmap indicating at least the first portion, the second bitmap indicating at least the second portion. The first access terminal and the second access terminal are configured to receive the group resource allocation message.

In accordance with another aspect of the present invention, one novel method for grouping the voice and data users and minimizing the impact of packet data transmission to VoIP performance is disclosed, the method comprising: assigning a data user to multiple groups so that the said data user shares an even larger resource pool and has less chance to conflict with VoIP traffics especially at retransmissions.

It is to be appreciated that embodiments of the present invention provide various advantages over conventional techniques. In a specific embodiment, the present invention provides a scheme where communication overhead is reduced by allocating both voice and data communication resources in a single group setup message. In addition, techniques according to the present invention are more efficient and reliable when compared with conventional techniques. Furthermore, various embodiments of the present invention are compatible with various conventional system, thereby allowing simple and inexpensive implementation. There are other advantages as well.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 3C is a simplified diagram illustrating the Mode 2 of Data Bitmap Header, which uses user Index to explicitly indicate the active data user in each data pipe.

FIG. 3D is a simplified diagram illustrating the Mode 3 of Data Bitmap Header, which uses one bit for each data user to indicate whether the corresponding user is assigned a data pipe ("1") to transmit or not ("0"). The length of Data Bitmap Header is M, given that there are M data users in the group.

DETAILED DESCRIPTION OF THE INVENTION

The present invention generally relates to telecommunication techniques. More particularly, the present invention relates to a method for providing a scheme in which groups of users are able to share communication resources (e.g., time-frequency resource) in a wireless communication network. More specifically, embodiments of the present invention allows wireless communication network users who are assigned to one or more groups to access and use the wireless communication network for various types of communications in an efficient manner by sharing communication channels. For example, valuable resources that are not utilized for voice communication is used for transferring data. But it would be recognized that the invention has a much broader range of applicability.

As explained above, conventional techniques for allocating communication resources are inadequate. Among other things, these techniques do not efficiently allocated unused resource for other uses, such as data transmission. According to the statistical characteristics of voice traffic, the assigned size of the set of time-frequency resources and the required VoIP latency and capacity requirement need to be traded off carefully. In contrast, according to various embodiments of the present invention, the left-over resources for a user group are efficiently allocated for data transmission. For example, with coexistence of both voice and data users, the present invention allows certain type of data users (for example, best effort traffic) in the group together with the VoIP users and have the data users take the left over resource for packet data transmissions.

It is to be appreciated that embodiments of the present invention are advantageous in various ways when compared to conventional systems. It is understood the present invention provides many different embodiments. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail.

Figure 2:
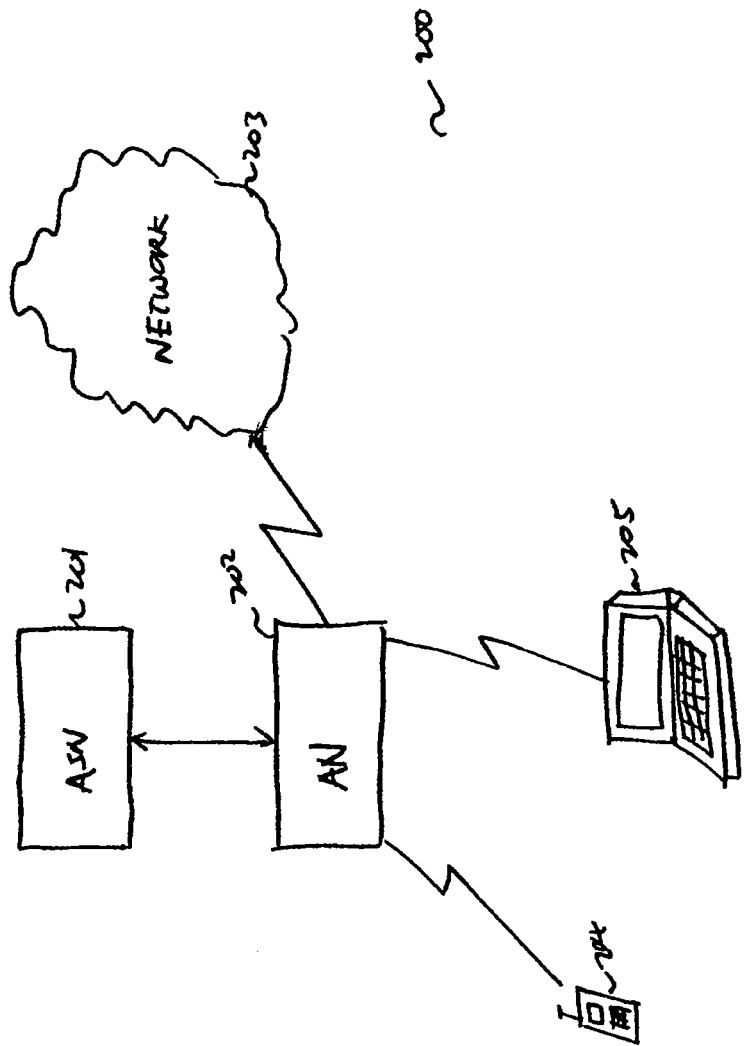
FIG. 2 is simplified diagram illustrating a system according to an embodiment of the present invention.

FIG. 2 is simplified diagram illustrating a system according to an embodiment of the present invention. This diagram is merely an example, which should not unduly limit the scope of the claims. One of ordinary skill in the art would recognize many variations, alternatives, and modifications. As shown in FIG. 2, a system 200 includes various elements, such as an AN 202, an ASN 201, a network 203, and access terminals (AT) 204 and 205. The AN 202 is configured to provide radio access to the AT's. For example, the AN 202 provides radio through a base station, which is a part of the AN 202. The AT can be various types of ATs. For example, the AT 204 is a cellular phone that is used for voice communication, while the AT 205 is a terminal used for data communication. The AN 202 is configured to provide both data access and voice access. According to the embodiments, the AN 202 is configured to allocate communicational resources (e.g., time-frequency resource in a multiplexing scheme) for both data and voice communication in a single Group Setup Message.

According to an embodiment of the present invention, the Group Setup Message is sent by a base station and/or an AN (e.g., the AN 202) to initially set up the grouping and to add user to the group. A group is defined with a set of group and user specified parameters, such as GroupID, resource location, number of VoIP users, number of data users, bitmap length, etc. For example, the Group Setup Message as shown in Table 1 is sent to each VoIP user and the Group Setup Message in Table 2 is sent to each data user. By assigning group for both voice and data users, embodiments of the present invention allows a minimization of the overhead requirement on MCS indication. For example, four MCS indices (Mod_Coding_1, 2, 3, and 4) are set in Group Setup Message for a data user based on this user's channel condition. Among other benefits, only 2 bits are needed to explicitly indicate the MCS index for a data user. In a specific embodiment, the mapping from the bits to actual MCS can be adjusted by upper layer signaling, based on long-term channel quality and/or power availability.

TABLE 2

Group Setup Message for Data Users

| Field | Description |
| --- | --- |
| MAC_Index | Unique identifier of the AT |
| Group_ID | Unique identifier for the group |
| Block_Size | The fundamental block size (e.g. 1 DRCH by 1 Frame) |
| Num_Blocks | Number of blocks assigned to this group |
| First_Block | Address of the first block in the assignment |
| Ordering_Pattern | One of a few choices indicating the order in which the blocks are to be distributed |
| Mod_Coding_1 | Lowest modulation and coding scheme '00' |
| Mod_Coding_2 | Third highest modulation and coding scheme '01' |
| Mod_Coding_3 | Second highest modulation and coding scheme '10' |
| Mod_Coding_4 | Highest modulation and coding scheme '11' |
| Interlace_Structure | The pattern and structure of the VoIP interlace |
| Bitmap1_VoIP_Length | Length of the VoIP bitmap in the first bitmap |

TABLE 2-continued

Group Setup Message for Data Users

| Field | Description |
| --- | --- |
| Bitmap2_Length | Length of the second bitmap (if used) |
| Num Users | Maximum number of data users in the group |
| Bitmap Header Mode | The way to indicate the active users |
| Bitmap_Channel | Time frequency resources for the bitmap itself |
| AT_Index | The bitmap position assigned to the AT (if bitmap for data users is used), or the index assigned to the AT |
| Scrambling Code | The unique scrambling code assigned to this user |
| MCS Length | Length of each MCS field |
| SIZE Length | Length of each SIZE field |
| Interlace_Offset | Offset assigned to the AT indicative of its first transmission |

Figures 3A, 3B:
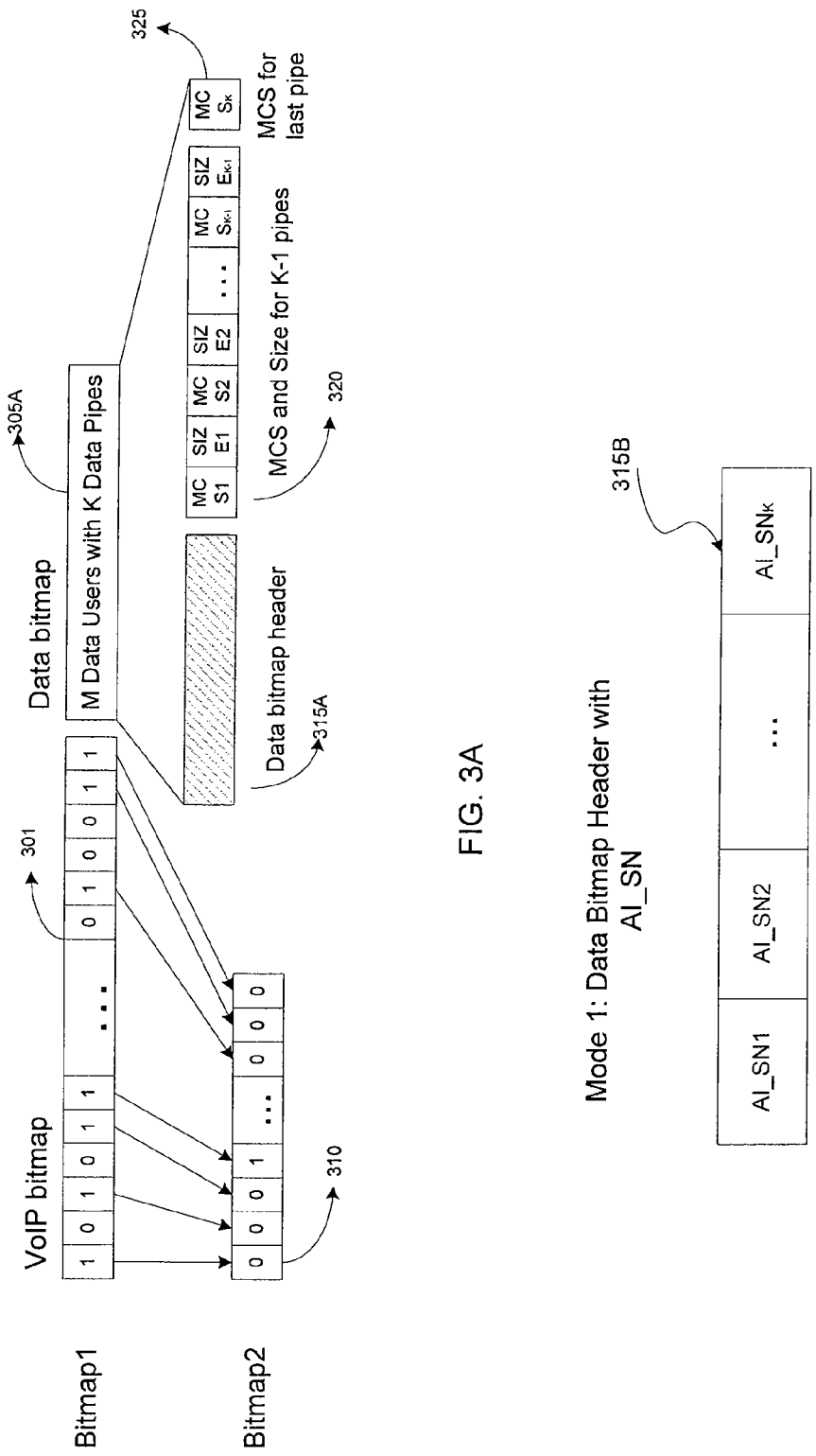
FIG. 3A is a simplified diagram illustrating an embodiment of using an extended bitmap signaling for allocating resource to N voice users and M data users with K data pipes.
FIG. 3B is a simplified diagram illustrating the Mode 1 of Data Bitmap Header, which uses one bit AI_SN for each data pipe to indicate new subpacket arrival.

FIG. 3A is a simplified diagram illustrating a method for multiplexing multiple (N) voice users and multiple (M) data users using an extended bitmap signaling according to an embodiment of the present invention. This diagram is merely an example, which should not unduly limit the scope of the claims. One of ordinary skill in the art would recognize many variations, alternatives, and modifications.

As shown in FIG. 3A, voice users and data users are assigned different priority (e.g., the voice users is assigned a higher priority level). While the voice users have higher priority to be served, the remaining resource, if any, may be divided to K (K<_M) data pipes which allow up to K data users transmitting at the same time. Following the VoIP bitmap 301, the data bitmap 305A is added to indicate the packet data transmission. According to embodiments, the VoIP bitmap 301 and the data bitmap 305A are encapsulated within a single message (e.g., group setup message). For example, the juxtaposition of two bitmaps is a part of wireless communication standards, such as standards proposed by the 3GPP2. The Bitmap2 310 is optional and provides extra information for VoIP users to indicate the number of assigned blocks and/or the packet format. According to an embodiment, a scheduler at the AN determines which data user is to be served, how much resource is assigned and which MCS is being used based on the channel quality, the QoS requirement and the buffer status, etc. It is to be appreciated that, depending on the application, the bitmap2 310 may be modified, replaced, and/or removed.

According to a specific embodiment, the data bitmap 305A includes a data bitmap header 315A and the corresponding MCS and resource size fields for the first (K−1) data pipes 320 as well as the MCS field for the last pipe 325. Each active data user will look at the bitmap for the users in front of it (including both voice and data), calculate the occupied blocks, and locate the exact blocks being assigned to the said data user. As each user has been notified with the total resource size, the last data pipe size can be easily calculated and needs MCS field only 325. For example, the last data pipe size may simply be the remaining data pipe that is available for data transferring.

It is to be appreciated that embodiments of the present invention are flexibly implemented to allow QoS policy to be determined easily and efficiently. Among other, the encoded packet size can be set based on the size of assigned resource and the MCS scheme used. In some instances, padding(s) may be needed if the information bits are less than the encoded packet size.

In certain embodiments, resource allocation is determined by a scheduler. For example, the scheduler is a part of the AN. It is to be understood that the scheduler may be flexibly implemented with existing systems. For example, the scheduler at the AN balances the power and MCS of the data user. The mapping from the MCS bits to actual packet format can be adjusted by upper layer signaling. As an example, when both M and K equal to one, the data bitmap will be reduced to 325 only, and 315A and 320 are not needed. In this scenario, one MCS value, e.g. "00", is reserved to indicate retransmission while values other than "00" indicate a new packet arrival. The data user will look at the voice bitmap 301 for all active voice users, identify the resource blocks assigned to the voice users, and remove the resource blocks that are assigned to the voice users from the entire resource blocks that are designated for this group in order to locate the left-over blocks being assigned to the said data user. If no resource is left from VoIP users according to the voice bitmap 301, the MCS index value is ignored.

FIG. 3B is simplified diagram illustrating a mode of implementation for the data bitmap header 315A according to an embodiment of the present invention. This diagram is merely an example, which should not unduly limit the scope of the claims. One of ordinary skill in the art would recognize many variations, alternatives, and modifications.

As shown in FIG. 3B, the Mode 1 of Data Bitmap Header is used for multiplexing multiple (N) voice users and multiple (M) data users to share the same time-frequency resource by using an AI_SN bit for each data pipe in Data Bitmap Header 315B. The length of Data Bitmap Header 315B is K bits (assuming that there are K data pipes). A new packet indicator (e.g., the AI_SN as described above) is used to indicate the start of a new packet for the data pipe, by means of setting as "1" or "0" or by toggling between "1" and "0". Once a new H-ARQ packet is indicated, data users in the group will try to blind detect the packet, but only the scheduled user in this data pipe will succeed, as the packet has been scrambled with this user's specific MACID. The receiver will, upon detecting a toggling of the AI_SN, flush the HARQ buffer at the receiver and begins the decode attempt with a fresh start. Otherwise, it will try to soft combine received symbols with the previously received symbols, which are stored in the buffer before trying to decode the packet. In an example, that the number of data pipes K equals to one, a single AI_SN remains in 315B, and 320 is not needed in FIG. 2A. If no resource is left from the previous users according to the bitmap, the AI_SN value is ignored.

FIG. 3C is a simplified diagram illustrating an alternative mode of implementation for the data bitmap header 315A according to another embodiment. This diagram is merely an example, which should not unduly limit the scope of the claims. One of ordinary skill in the art would recognize many variations, alternatives, and modifications. As shown in FIG. 3C, Data Bitmap Header 315C is used for multiplexing multiple (N) voice users and multiple (M) data users to share the same time-frequency resource by using user index for each data pipe in Data Bitmap Header 315C. Assuming that there are L bits in Index (supporting up to M=2^L data users), the length of Data Bitmap Header 315C is L*K bits. In this embodiment, the MCS fields in 320 and 325 in FIG. 3A need to reserve one value, e.g. "000", to indicate the retransmission of a packet while all other values indicate new packet transmission. In the example that the number of data pipes K equals to one, a single user Index field remains in 315C, but the MCS field (e.g., the MCS field 320 in FIG. 3A) may be removed. That is, the single user in this particular case is assigned with all the data communication resources. For example, under this scenario the MCS can be set as a function of the size of the leftover resources for this data user. Alternative, the data user can blindly decode the packet using multiple MCS hypotheses. Typically, this mode may be preferable when number of data pipes K is small compared to number of data users M in the group. For example, if no resource is left from the previous users according to the bitmap, the MCS index value is ignored.

FIG. 3D is a simplified diagram illustrating an alternative mode of implementation for data bitmap header 315A according to an embodiment. This diagram is merely an example, which should not unduly limit the scope of the claims. One of ordinary skill in the art would recognize many variations, alternatives, and modifications. As shown in FIG. 3D, a Data Bitmap Header 315D is used for multiplexing multiple (N) voice users and multiple (M) data users to share the same time-frequency resource by using bitmap in Data Bitmap Header as shown in 315D. More specifically, one bit is used at a fixed position for each data user to indicate whether the corresponding user is assigned a data pipe ("1") to transmit or not ("0"). For example, the length of Data Bitmap Header is M, given that there are M data users in the group. In the embodiment, the MCS fields (e.g., the MCS fields 320 and 325 in FIG. 3A) need to reserve one value, e.g. "000", to indicate the retransmission of a packet while all other values indicate new packet transmission. This mode may be preferable when the number of data pipes K is close to number of data users M in the group. For example, if there is no left over resource from VoIP users, the all data bitmap will be set to zero.

As explained above, the diagrams described above are In all the embodiments above, bitmap2 305A is optional for VoIP users. Data users will work properly without the present of bitmap2 305A.

In certain embodiments, the Data Bitmap Header 315A can also use a mixture of user index, bitmap indication and AI_SN to indicate the active users.

Depending on the application, various types of methods may be used for retransmission of the data packets. For example, one method is to delay the subpacket retransmission until the resource becomes available. Another method is to use adaptive retransmission, i.e., partitioning the subpacket to fit in the size of the left over resource for retransmissions. A more aggressive method is to allow AN to reserve the needed resource in the group for any subpacket retransmission until this subpacket is acknowledged or the maximum number of retransmissions is reached, although this may slightly affect the VoIP user transmissions. In certain cases, it is also possible to use F_SCCH, the forward link shared control channel, to schedule any available resource not reserved by any other groups for the subpacket retransmission.

In certain embodiments, a data user can also be a member for multiple groups. This data user receives multiple Group Setup Messages, which identify the data user as a member that belongs to multiple groups, and therefore monitors multiple bitmaps from the AN. As an example, at a certain frame, the AN will activate the data user in no more than one of the groups for data transmission. A larger pool of resources is available to the said data user which results in a larger trunking efficiency. Furthermore, this leads to less constraint to the subpacket retransmissions, as the AN can assign the active data user any available resource in any of the groups for retransmissions, using left over resource and/or sophisticated scheduling over VoIP users. If the capability permits, the user may also be served by multiple groups simultaneously. If there is only one encoded packet across all the group resources, one ACK/NAK is sufficient, otherwise, multiple ACK/NAK are needed. It is to be understood that various embodiments of the present invention utilizes a single ACK/NAK channel for setting up both the voice and data user group, thereby lowering wireless communication overhead.

To further alleviate the constraint over retransmission resource, a power control is used to target an earlier termination than the default so that the number of retransmissions can be reduced.

Figure 1:
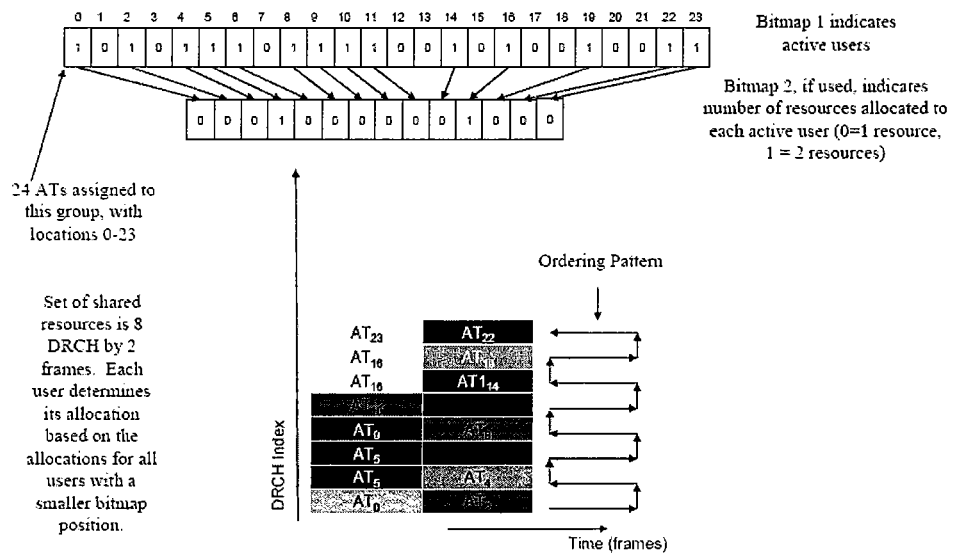
FIG. 1 is a simplified diagram illustrating an example of conventional method of grouping voice users using bitmap signaling.

The ACK/NAK channel design is provided with a shared resource composing of two frames (e.g., the two frames as shown in FIG. 1). Assuming that there are N VoIP users and M data users, the VoIP users are indexed based on their positions in the first bitmap as 1, 2, . . . , N, and the M data users are sequentially indexed following the VoIP users in the first bitmap as N+1, N+2, . . . , N+M. The ATs are assigned an ACK position based on their indices. For example with the first N/2 (i.e., the first half) VoIP ATs and M/2 data ATs will be assigned to transmit their ACK in the first ACK position, while the second N/2 ATs and M/2 data ATs will be assigned to transmit their ACK in the second ACK position. Similarly, an even/odd structure could be used, whereby ATs with an odd index will be assigned to transmit their ACK in the first ACK position, while ATs with an even index will be assigned to transmit their ACK in the second ACK position. According to an embodiment, the access terminals are configured to send an ACK message at a first available channel position.

Broadcasting information (e.g., group management information) to all the users within a group is achieved with various methods. As an example, one extra bit is added in bitmap to indicate whether the leftover resource is used to for broadcast or not. As another example, when using data user index, one value (e.g., '111' if 3 bits are used) can be reserved to indicate broadcast transmission in the left over resources. As a further example, one can also use F_SCCH to indicate the broadcast transmission in the left over resources, or other resources outside the group. As yet another example, AN can transmit broadcast packets scrambled by GroupID and let ATs in the said group blindly detect the packets. It is to be understood that there are other variations as well.

The VoIP and data users in the embodiments of the present invention can be further generalized to two user types, while the first type of users are of higher priority with, for example, latency sensitive services, and the second type of users are of lower priority with, for example, latency insensitive services. The methods described above still apply.

However, it should be obvious to those skilled in the art that other ways of setting the values of the reserved bits are possible without deviating from the spirits of the present invention.

Although the messages are sent by the base station and received by the mobile station in various examples illustrated in the previous sections, the present invention contemplates to use these novel methods on the messages sent by anyone communications terminal and received by any other communications terminal.

The various illustrative logical blocks, modules, and circuits described in connection with the embodiment disclosed herein may be implemented or performed with, but not limited to, a general purpose processor, a digital signal processor (DSP), an application specific integrated circuit (ASIC), a memory device such as RAM, ROM, EPROM, or EEPROM, a field programmable gate array (FPGA) or other programmable logic device, discrete gate or transistor logic, discrete hardware components, and any combination thereof designed to perform the functions described herein.

According to an embodiment, the present invention provides a method for resource allocation in a wireless communication network. The method includes providing an access node. The access node is configured to provide wireless access for both voice and data services. The method also includes providing at least a first access terminal that is configured to perform at least voice communication through the access node. Additionally, the method includes providing at least a second access terminal that is configured to perform at least data communication through the access node. The method further includes allocating a first portion of communication resources to the first access terminal. The method additionally includes allocating a second portion of communication of resources to the second access terminal. Furthermore, the method includes generating and sending a group resource allocation message, which includes at least a first bitmap and a second bitmap, to at least the first access terminal and the second access terminal. The first bitmap indicates at least the first portion. The second bitmap indicates at least the second portion. The method also includes sending the group setup message to at least the first access terminal and the second access terminal to define the specific group parameters associated with the group. For example, the embodiment is illustrated according to FIGS. 2-3D.

According to another embodiment, the present invention provides a method for communication in a wireless communication network. The method includes providing an access node that is configured to provide wireless access for both voice and data services. The method also includes providing at least a first access terminal that is configured to perform at least data communication through the access node. The method further includes receiving a group resource allocation message by the first access terminal. The group resource allocation message includes at least a first bitmap and a second bitmap. The first bitmap indicates a first resource allocation associated with a voice communication. The second bitmap indicates a second resource allocation associated with a data communication. The method additionally includes transferring data by the second access terminal based the first resource allocation indicated by the first bitmap. For example, the embodiment is illustrated according to FIGS. 2-3D.

According to yet another embodiment, the present invention provides a system for resource allocation in a wireless communication network. The system includes an access node that is configured to provide wireless access for both voice and data services. The system also includes at least a first access terminal that is configured to perform at least voice communication through the access node. The system further includes at least a second access terminal that is configured to perform at least data communication through the access node. The access node is further configured to allocate a first portion of communication resources to the first access terminal. The access node is further configured to allocate a second portion of communication of resources to the second access terminal. The access node is further configured to generate a group resource allocation message, the group resource allocation message including at least a first bitmap and a second bitmap, the first bitmap indicating at least the first portion, the second bitmap indicating at least the second portion. The first access terminal and the second access terminal are configured to receive the group resource allocation message. For example, the embodiment is illustrated according to FIGS. 2-3D.

It is to be appreciated that embodiments of the present invention provide various advantages over conventional techniques. In a specific embodiment, the present invention provides a scheme where communication overhead is reduced by allocating both voice and data communication resources in a single group resource allocation message. In addition, techniques according to the present invention are more efficient and reliable when compared with conventional techniques. Furthermore, various embodiments of the present invention are compatible with various conventional system, thereby allowing simple and inexpensive implementation. There are other advantages as well.

Obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. A method for resource allocation in a wireless communication network, the method comprising:
allocating a first portion of communication resources to a first access terminal being configured to perform at least voice communication through an access node, the access node being configured to provide wireless access for at least both voice and data services;
allocating a second portion of communication resources to a second access terminal, said second access terminal being configured to perform at least data communication without the statistical characteristics of voice traffic;
generating a first message, wherein the first message is a group resource allocation message for a first group of access terminals comprising a first set of voice access terminals sharing the first portion of communication resources, and a second set of data access terminals sharing the second portions of communication resources, and wherein the second access terminal is associated with the second set of data access terminals of the first group of access terminals and is also associated with a second group of access terminals comprising a third set of data access terminals and a fourth set of voice access terminals, the first message including at least a first bitmap and a second bitmap, the first bitmap indicating at least the first portion of the communication resources, the second bitmap indicating at least the second portion of the communication resources; and
sending the first message to the first set of access terminals and the second set of access terminals.

2. The method of claim 1 further comprising sending a variable-size HARQ packet to the second set of access terminals.

3. The method of claim 1 further comprising defining a portion size for the second set of access terminals.

4. The method of claim 1 further comprising sending an ACK response from second set of access terminals to the access node through a first available channel position.

5. The method of claim 1 wherein the first bitmap comprises a voice bitmap.

6. The method of claim 1 wherein the second bitmap comprises a data bitmap.

7. The method of claim 1 wherein the first portion of communication resources comprises a time slot for voice communication.

8. The method of claim 1 wherein the second portion of communication resources comprises a pipeline for data communication.

9. The method of claim 1 wherein:
the first message further includes a third bitmap, the third bitmap being associated with the second bitmap;
the third bitmap includes a number of bits, each of the number of bits being associated with a data pipeline.

10. The method of claim 1 wherein:
the first message further includes a third bitmap, the third bitmap being associated with the second bitmap;
the third bitmap includes a number of bits, each of the number of bits being associated with a data terminal connected to the access node.

11. The method of claim 1 wherein:
the first message further includes a third bitmap;
the third bitmap indicates an activity status of the second portion of communication resources allocated to the second access terminal.

12. The method of claim 1 wherein the first portion of communication resources is in a higher priority than the second portion of communication resources.

13. The method of claim 1 further comprising broadcasting the first message to the first group of access terminals.

14. The method of claim 1 wherein wireless communication is in accordance with the 3GPP2 standard.

15. The method of claim 1 wherein the voice comprises voice over IP data.

16. The method of claim 1 further comprising providing multiplexing for voice communication over a time domain.

17. The method of claim 1 further comprising providing multiplexing for voice communication over a frequency domain.

18. A system for resource allocation in a wireless communication network, the system comprising:
an access node, the access node being configured to provide wireless access for both voice and data services;
at least a first access terminal, the first access terminal being configured to perform at least voice communication through the access node; and
at least a second access terminal, the second access terminal being configured to perform at least data communication without the statistical characteristics of voice traffic through the access node;
wherein:
the access node is further configured to allocate a first portion of communication resources to the first access terminal;
the access node is further configured to allocate a second portion of communication resources to the second access terminal;
the access node is further configured to generate a group resource allocation message for a first group of access terminals comprising a first set of voice access terminals sharing the first portion of communication resources, and a second set of data access terminals sharing the second portions of communication resources, and wherein the second access terminal is associated with the second set of data access terminals of the first group of access terminals and is also associated with a second group of access terminals comprising a third set of data access terminals and a fourth set of voice access terminals, the message including at least a first bitmap and a second bitmap, the first bitmap indicating at least the first portion, the second bitmap indicating at least the second portion;
the first set of access terminals and the second set of access terminals are configured to receive the group resource allocation message.

19. The system of claim 18 wherein the access node includes a scheduler for allocating the first portion and the second portion of communication resources.

20. The system of claim 18 wherein the access node comprises a base station.

21. The system of claim 18 wherein the access node comprises a communication interface.

22. The system of claim 18 wherein the access node is configured to provided data modulation.

23. A method for resource allocation in a wireless communication network, the method comprising:
- allocating a first portion of a communication resource to a first set of access terminals for performing voice communication through an access node, the access node being configured to provide wireless access for both voice and data services;
- allocating a second portion of the communication resource to a second set of access terminals for performing data communication without the statistical characteristics of voice traffic;
- generating a group resource allocation message for a first group of access terminals comprising the first set of access terminals and the second set of access terminals, wherein an access terminal in the second set of access terminals also is in a second group of access terminals comprising a third set of access terminals configured to perform voice communication through the access node, and a fourth set of access terminals configured to perform data communication without the statistical characteristics of voice traffic, the group resource allocation message including a first bitmap and a second bitmap, the first bitmap indicating the first portion of the communication resource, the second bitmap indicating the second portion of the communication resource; and
- sending the group resource allocation message to the first set of access terminals and the second set of access terminals.

* * * * *